(12) United States Patent
Brimeyer et al.

(10) Patent No.: US 10,820,510 B2
(45) Date of Patent: Nov. 3, 2020

(54) CUTTERBAR ANGLE CHANGE WITH FOUR BAR LINKAGE

(71) Applicant: Deere & Company, Moline, IL (US)

(72) Inventors: Alex Brimeyer, Bettendorf, IA (US); Bryan R. Yanke, Eldridge, IA (US); Joshua R. Pierson, Davenport, IA (US)

(73) Assignee: Deere & Company, Moline, IL (US)

( * ) Notice: Subject to any disclaimer, the term of this patent is extended or adjusted under 35 U.S.C. 154(b) by 182 days.

(21) Appl. No.: 16/010,200

(22) Filed: Jun. 15, 2018

(65) Prior Publication Data

US 2019/0380269 A1  Dec. 19, 2019

(51) Int. Cl.
| | | |
|---|---|---|
| *A01D 41/14* | (2006.01) |
| *A01B 59/00* | (2006.01) |
| *A01B 59/06* | (2006.01) |
| *A01B 63/02* | (2006.01) |

(52) U.S. Cl.
CPC .......... *A01D 41/145* (2013.01); *A01B 59/002* (2013.01); *A01B 59/064* (2013.01); *A01B 63/02* (2013.01)

(58) Field of Classification Search
CPC ..... A01B 59/064; A01B 63/02; A01B 59/002; A01D 41/145; A01D 34/54; A01D 47/00; A01D 57/03; A01D 41/14; A01D 41/141
See application file for complete search history.

(56) References Cited

U.S. PATENT DOCUMENTS

| 3,574,990 | A |   | 4/1971  | Calder           |            |
|-----------|---|---|---------|------------------|------------|
| 3,959,957 | A | * | 6/1976  | Halls            | A01D 41/14 |
|           |   |   |         |                  | 56/208     |
| 4,137,696 | A |   | 2/1979  | Webb             |            |
| 4,206,582 | A | * | 6/1980  | Molzahn          | A01D 57/00 |
|           |   |   |         |                  | 56/15.8    |
| 4,724,661 | A |   | 2/1988  | Blakeslee et al. |            |
| 4,843,804 | A |   | 7/1989  | Wellman          |            |
| 4,961,303 | A | * | 10/1990 | McCarty          | A01D 43/107|
|           |   |   |         |                  | 100/169    |

(Continued)

FOREIGN PATENT DOCUMENTS

| CN | 107347378   | A  |   | 11/2017 |            |
|----|-------------|----|---|---------|------------|
| EP | 1378159     | A1 | * | 1/2004  | A01D 34/8355 |

(Continued)

OTHER PUBLICATIONS

European Search Report issued in counterpart European Patent Application No. 19180169.5 dated Jan. 8, 2020 (9 pages).

(Continued)

*Primary Examiner* — Arpad Fabian-Kovacs (74) *Attorney, Agent, or Firm* — Foley & Lardner LLP (57) ABSTRACT

A control arm linkage system includes a pair of upper control arms and a pair of lower control arms to attach a crop harvesting header to a harvester frame of an agricultural harvester. The attachment of the header to the harvester via the control arm linkage system allows the header to move relative the harvester, with the header being displaced upward and heeled backwards in response to an upward force being imparted onto a lower surface of the header. The control arm linkage system thus allows the header to automatically adjust and adapt to unexpected raised mound that may be encountered along the path of the header during harvesting.

19 Claims, 3 Drawing Sheets

(56) References Cited

U.S. PATENT DOCUMENTS

| | | | | |
|---|---|---|---|---|
| 5,157,905 A * | 10/1992 | Talbot | A01D 41/14 56/15.9 |
| 5,327,709 A * | 7/1994 | Webb | A01D 41/14 56/14.4 |
| 5,359,836 A | 11/1994 | Zeuner et al. | |
| 5,464,371 A * | 11/1995 | Honey | A01D 41/14 460/20 |
| 5,535,578 A * | 7/1996 | Honey | A01D 41/145 56/14.9 |
| 5,633,452 A * | 5/1997 | Bebernes | A01D 41/145 56/10.2 E |
| 6,675,568 B2 * | 1/2004 | Patterson | A01D 41/14 56/208 |
| 7,207,164 B2 * | 4/2007 | Bomleny | A01D 41/141 56/10.2 E |
| 7,222,475 B2 * | 5/2007 | Bomleny | A01D 41/141 56/10.2 E |
| 7,555,883 B2 * | 7/2009 | Fackler | A01D 41/145 56/10.2 E |
| 7,603,837 B2 * | 10/2009 | Ehrhart | A01D 34/283 56/10.2 E |
| 7,661,251 B1 * | 2/2010 | Sloan | A01D 41/141 56/10.2 E |
| 7,726,109 B2 * | 6/2010 | Thompson | A01D 34/661 56/15.8 |
| 7,869,922 B2 * | 1/2011 | Otto | A01D 41/145 56/10.2 E |
| 8,560,182 B2 * | 10/2013 | Ringwald | A01D 46/08 56/10.2 E |
| 9,258,941 B2 | 2/2016 | Enns et al. | |
| 9,775,291 B2 * | 10/2017 | Neudorf | A01D 41/145 |
| 10,405,474 B2 * | 9/2019 | Brimeyer | A01D 41/16 |
| 10,517,215 B2 * | 12/2019 | Brimeyer | A01D 41/16 |
| 2007/0214760 A1 * | 9/2007 | Bomleny | A01D 41/141 56/10.2 E |
| 2014/0237980 A1 * | 8/2014 | Verhaeghe | A01D 41/145 56/320.1 |
| 2014/0311115 A1 * | 10/2014 | Verhaeghe | A01D 34/54 56/251 |

FOREIGN PATENT DOCUMENTS

| | | |
|---|---|---|
| WO | 2008104816 A1 | 9/2008 |
| WO | 2013011140 A1 | 1/2013 |
| WO | 2014025346 A1 | 2/2014 |

OTHER PUBLICATIONS

MACDON, FlexDraper Combine Header Operator's Manual, 2018, 552 pages.

MACDON, FlexDraper Combine Header Parts Catalog, Aug. 2017, 186 pages.

* cited by examiner

CUTTERBAR ANGLE CHANGE WITH FOUR BAR LINKAGE

FIELD OF THE DISCLOSURE

The present disclosure relates to agricultural harvesters, and, more particularly, to a system configured to permit the header of a harvester to follow and/or adjust to changes in ground contours.

BACKGROUND

An agricultural harvester, such as, e.g., a combine or windrower, is a large machine used to harvest a variety of crops from a field. During a harvesting operation, a cutterbar carried by a header which is supported at the front of the harvester cuts ripened crop from the field. For many crops, it is important for the header to travel very close to the ground, so as to maximize the amount of crop that is harvested. For low-growing crops such as soybeans, which are small bush-like plants only a foot or two high, the header is often positioned to drag along the ground itself, or bounce slightly over the surface of the ground to ensure that it captures the entirety of the crop.

However, operating the header close to the ground increases a risk of the header unexpectedly running into raised mounds of terrain, which may result in pushing (i.e. digging) of the cutterbar or header into the raised mounds. In such scenarios, as material is pulled into the header, the header may become obstructed, requiring that the operator stop operation of the harvester to clear the header. Not only do such header obstructions pose an inconvenience to the operator and increase the time required to complete harvesting, but, if unattended to, such obstructions of the header may result in damage to the header.

Various lift mechanisms configured to raise the height of the header with respect to the ground have been developed in an attempt to overcome the obstacles of harvesting crops (and particularly low growing crops) on uneven terrain. Although the ability to raise the header to a height sufficient to clear raised portions of terrain offered by such lift mechanisms may minimize the damage to the header that may result from pushing, operation of such lift mechanisms to raise the header typically requires that the operator stop the harvester to actuate the lift mechanism. Additionally, although raising the height of the header may allow the header to clear raised terrain and avoid obstruction and damage to the header, the resulting increased height of the header and cutterbar increases the attack angle at which the crop is cut. While for high growth crops (such as, e.g., corn) such an increase in attack angle may have a negligible effect on harvest yield, for low growing crops such as, e.g., soybeans, the operation of the header at such elevated heights may have a noticeable, detrimental impact on harvest yield.

SUMMARY

One implementation of the present disclosure is an agricultural harvester including a harvester frame, a crop harvesting header, and a control arm linkage assembly. The control arm linkage assembly coupling a rear end of the header to a front end of a harvester frame. The control arm linkage assembly includes a first upper control arm having a front end pivotably coupled to an upper portion of a first side of the header and a rear end pivotably coupled to an upper portion of a first side of the harvester frame. The control arm linkage assembly further includes a second upper control arm having a front end pivotably coupled to an upper portion of a second side of the header and a rear end pivotably coupled to an upper portion of a second side of the harvester frame. The control arm linkage assembly further includes a first lower control arm having a front end pivotably coupled to a lower portion of the first side of the header and a rear end pivotably coupled to a lower portion of the first side of the harvester frame. The control arm linkage assembly further includes a second lower control arm having a front end pivotably coupled to a lower portion of the second side of the header and a rear end pivotably coupled to a lower portion of the second side of the harvester frame. A length of the first upper control arm is substantially the same as a length of the second upper control arm and a length of the first lower control arm is substantially the same as a length of the second lower control arm. The lengths of the first and second upper control arms are shorter than the lengths of the first and second lower control arms. The control arm linkage assembly is configured to simultaneously raise the header upward relative to the harvester frame and heel the upper portion of the rear end of the header towards the front end of the harvester in response to an upward force being imparted onto a lower surface of the header.

In some embodiments, the front ends of the first and second upper control arms are each located rearwards relative to the front ends of the first and second lower control arms. In some embodiments, the front ends of the first and second upper control arms are each located upward relative to the rear ends of the first and second upper control arms. In some embodiments, the front ends of the first and second lower control arms are each located upward relative to the rear ends of the first and second lower control arms.

In some embodiments, the lengths of the first and second upper control arms are each between approximately 355 mm and approximately 365 mm. In some embodiments, the lengths of the first and second lower control arms are each between approximately 545 ram and approximately 555 mm. In some embodiments, the lengths of the first and second lower control arms are between approximately 40 percent and approximately 60 percent greater than the lengths of each of the first and second upper control arms.

In some embodiments, the pivotable coupling of the rear ends of the first and second upper control arms to the harvester frame defines an arcuate upper path and the pivotable coupling of the rear ends of the first and second lower control arms to the harvester frame defines an arcuate lower path. The raising and heeling of the header in response to an upward force being imparted onto the lower surface of the header is constrained by the arcuate upper path and the arcuate lower path.

In some embodiments, an attack angle of the header as defined between the lower surface of the header and the horizon is configured to vary by an angle of between approximately 0.5 degrees and approximately 3.0 degrees in response to an upward force being imparted onto the lower surface of the header.

One implementation of the present disclosure is a control arm linkage assembly for an agricultural harvester including an upper control arm defined by a first length. The control arm linkage assembly further includes a lower control arm defined by a second length. The second length is between approximately 40 percent and approximately 60 percent greater than the first length. A front upper attachment couples a front end of the upper control arm to an upper portion of a crop harvesting header. A rear upper attachment couples a rear end of the upper control arm to an upper portion of a harvester frame of a harvester. A front lower attachment couples a front end of the lower control arm to a lower portion of the header. A rear lower attachment couples a rear end of the lower control arm to a lower portion of the harvester frame. The control arm linkage assembly is configured to vary an angle defined between a lower surface of the header and the horizon by between approximately 0.5 degrees and approximately 3.0 degrees in response to an upward displacement of the header relative to the harvester frame. A distance defined between a rear surface of an upper portion of the header and a front end of the harvester frame located directly opposite the upper portion of the header is decreased in response the upward displacement of the header relative to the harvester frame.

In some embodiments, the movement of the header relative to the harvester frame is constrained by the couplings of the upper control arm and lower control arm to the header and harvester frame. In some embodiments, the movement of the header relative to the harvester frame is defined by a generally arcuate travel path. In some embodiments, the front end of the upper control arm and the front end of the lower control arm are each pivotably coupled to the header.

In some embodiments, the front ends of the upper control arm and lower control arm are each attached to a left side of the header and the rear ends of the upper control arm and lower control arm are each attached to a left side of the harvester frame. The control arm linkage assembly further includes a second upper control arm and a second lower control arm. The front ends of each of the second upper and lower control arms are coupled to a right side of the header and the rear ends of each of the second upper and lower control arms are coupled to a right side of the harvester frame.

In some embodiments, a body defined between the front ends and the rear ends of the upper control arm extends fixedly about a substantially linearly axis about which the body is disposed. In some embodiments, a body defined between the front ends and the rear ends of the lower control arm extends fixedly about a substantially linearly axis about which the body is disposed.

One implementation of the present disclosure is a header terrain following system including a crop harvesting header, a harvester frame defined by an agricultural harvester; a control arm linkage assembly. The control arm linkage assembly pivotably attaches the header relative to the harvester frame. The control arm linkage assembly includes a pair of identical upper control arms extending between upper portions of the header and harvester frame along both the right and left sides of the header and harvester and a pair of identical lower control arms extending between lower portions of the header and harvester frame along both the right and left sides of the header and harvester. In response to a vertical movement of the header relative to the harvester frame, the control arm linkage assembly is configured to cause a movement of the lower portion of the header relative to the harvester frame in a direction downwards and away from the harvester frame and a movement of the upper portion of the header relative to the harvester frame in a direction upward and towards the harvester frame.

In some embodiments, the movement of the lower portion of the header and the movement of the upper portion of the header are each defined by arcuate paths. In some embodiments, the length of the lower control arms is greater than the length of the upper control arms. In some embodiments, the length of the lower control arms is between approximately 40 percent and approximately 60 percent greater than the length of the upper control arms.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Referring generally to the FIGURES, a control arm linkage assembly 200 configured to allow a header 50 attached to a harvester to more easily adjust to uneven terrain is shown. As will be described in more detail below, the control arm linkage assembly 200 is configured to minimize the risk of pushing in situations in which the header 50 encounters raised materials, without requiring any operator intervention and while minimizing harvest yield that may be lost as the header travels over such raised materials.

Figure 1A:
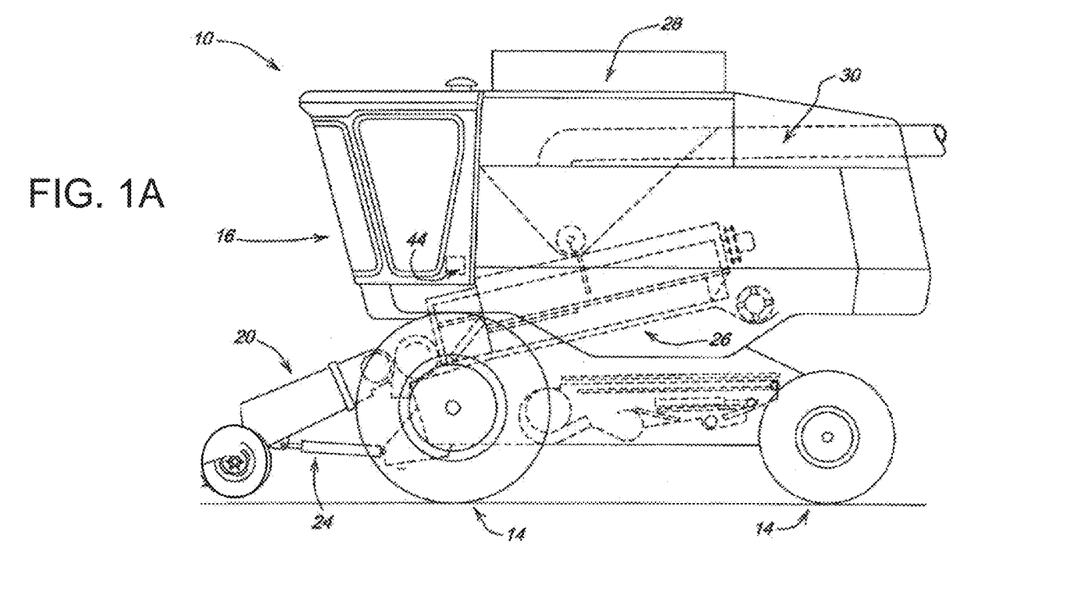
FIG. 1A illustrates a combine to which a header may be attached via a control arm linkage assembly, according to some embodiments.

In general, a header 50 having a control arm linkage assembly 200 as will be described in more detail below may be used with any number of different harvesters. For example, illustrated in FIG. 1A is one embodiment of a self-propelled combine 10 commonly used in farming to harvest a variety of crops with which the header 50/control arm linkage assembly 200 as described herein may be used. As shown in FIG. 1A, an onboard engine powers the combine 10, while ground engaging wheels 14 support and propel the combine 10. An operator controls the combine 10 from an operator's station located in a cab 16 at the front of the combine 10. A feederhouse 20 configured to support the header 50 is pivotably attached at the front of the combine 10, with the feederhouse 20 being configured to support the header 50 via either a direct linkage (in which case the control arm linkage assembly 200 attaches the header 50 directly to the feederhouse 20) or via an indirect linkage (in which case the control arm linkage assembly 200 attaches the header 50 to a subframe, which in turn, is attached to the feederhouse 20).

Figure 1B:
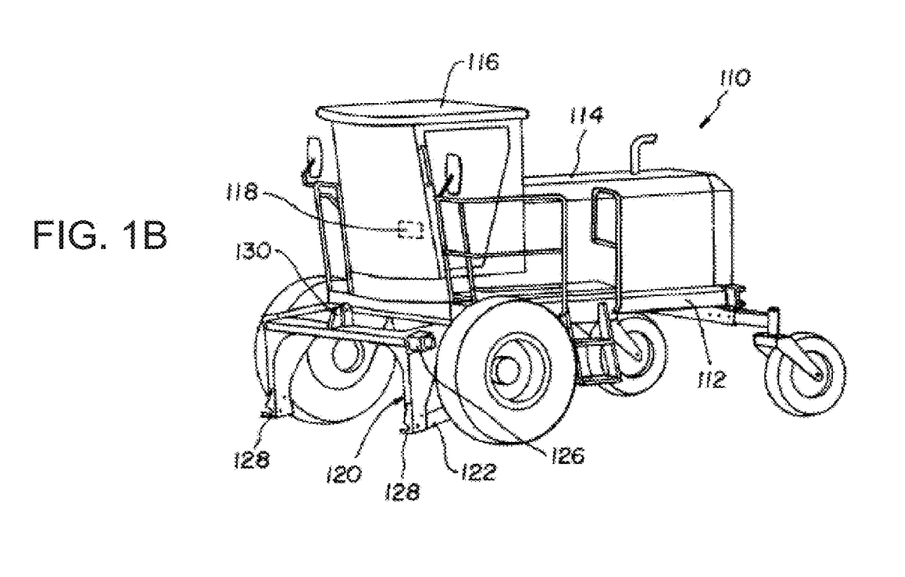
FIG. 1B illustrate a windrower to which a header may be attached via a control arm linkage assembly, according to some embodiments.

According to other embodiments, the control arm linkage assembly 200 may be used to attach a header 50 to a windrower 110, such as, e.g., shown in FIG. 1B. Similar to combine 10 shown in FIG. 1A, windrower 110 includes a vehicle chassis 112 supporting a vehicle body 114 and operator's cab 116. Windrower 110 also includes a lift frame 120 which is pivotably mounted to a vehicle chassis 112 and which detachably couples with header 50. Similar to the example of the combine 10 of FIG. 1A, in such embodiments in which the header 50 is used with a windrower 110, the header 50 may be supported by the lift frame 120 via either a direct linkage (in which case the control arm linkage assembly 200 attaches the header 50 directly to the lift frame 120) or via an indirect linkage (in which case the control arm linkage assembly 200 attaches the header 50 to a subframe, which in turn, is attached to the lift frame 120).

As will be understood, the combine 10 of FIG. 1A and the windrower 110 of FIG. 1B are representative, non-limiting examples of different types of harvesters with which the header 50/control arm linkage assembly 200 may be used, with the header 50/control arm linkage assembly 200 being capable of being used on any other number of different types of harvesters.

Figure 2:
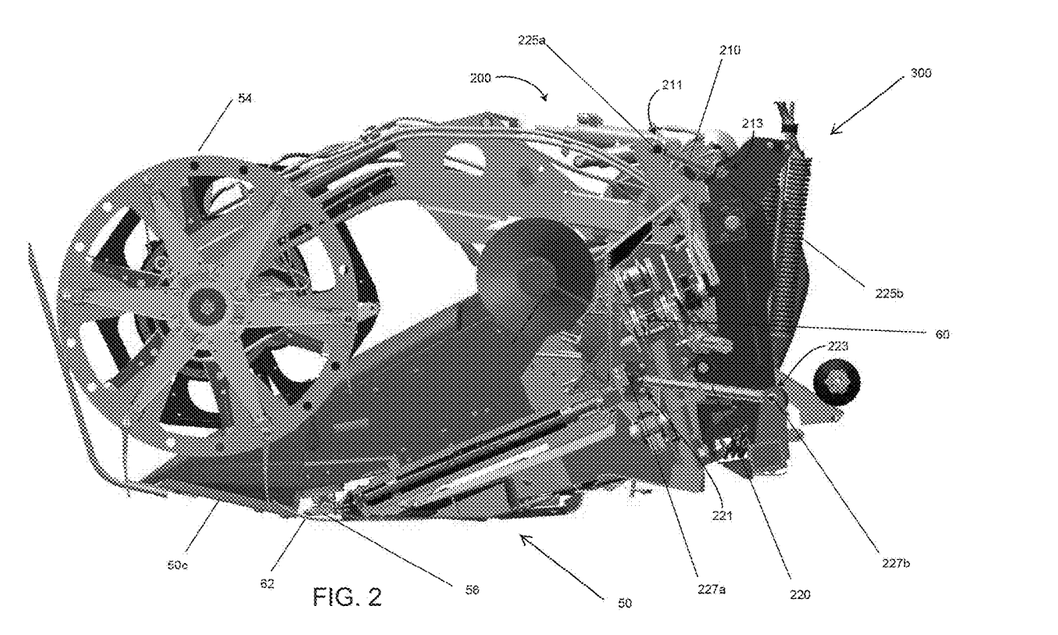
FIG. 2 illustrates a header and attached to a harvester frame via a control arm linkage assembly, according to some embodiments.

Shown in FIG. 2 is a left-side view of a header 50 having a control arm linkage assembly 200 attached to a harvester frame 300 according to one embodiment. As will be understood, the block drawing of the harvester frame 300 illustrated in FIG. 2 is presented for representative purposes only, and is intended to represent a feederhouse 20, a lift frame 120, a sub frame, or any other component of a harvester to which a header 50 may be directly attached. As illustrated by FIG. 2, according to various embodiments, the header 50 generally supports a reel assembly 54 and a cutterbar 56 which is disposed across a portion of or the entire leading front of the bottom surface 50c of the header 50 and which is configured to sever crop plants at their roots.

In embodiments in which the header 50 is used to harvest low growing crops (e.g. soybeans), the header 50 may be attached to the harvester frame 300 at heights between approximately 0 mm to approximately 30 mm off of the ground, with portions of the header 50 being configured to run across the ground during operation of the harvester. Accordingly, as shown in FIG. 2, in some embodiments the header 50 may optionally include a float system 60 configured to float or support the weight of the header 50 during use. In such embodiments of header 50 in which a float system 60 is incorporated, the float system 60 may comprise any number of, or any combination of, known float system arrangements, including, e.g., a pair of spaced apart resilient springs, hydraulic cylinders, etc., so long as the incorporation of the float system 60 does not interfere with the intended operation of the control arm linkage assembly 200 as described below. According to some embodiments, the header 50 may additionally, or alternatively, also optionally include a pair of spaced apart ground engaging skid shoes 62 or other support members, such as, e.g., a gage-wheel, to facilitate moving the header 50 across the ground.

Although the optionally included float system 60 and/or skid shoes 62 may serve to reduce the apparent weight of the header 50 and/or may act as a shock absorbing suspension system, and may enable the header 50 to more easily follow and adapt to changing terrain as the header 50 skims across the surface of the ground, the optionally included float system 60 and/or skid shoes 62 are generally not configured to adjust to abrupt or sudden changes in terrain. Accordingly, as shown in FIG. 2, even in header 50 embodiments incorporating a float system 60 and/or skid shoes 62, header 50 is provided with a control arm linkage assembly 200 configured to allow the header 50 to automatically adjust and adapt to unexpected unevenness in terrain, without requiring any user input to do so.

In general, control arm linkage assembly 200 comprises a pair of upper control arms 210 and a part of lower control arms 220 that are attached to and extend between the header 50 and the harvester frame 300. More specifically, the upper control arms 210 extend between and connect an upper portion 50d of the header 50 to an upper portion 300d of a harvester frame 300 while the lower control arms 220 extend between and connect a lower portion 50e of the header 50 to a lower portion 300e of the harvester frame 300. Although FIG. 2 illustrates only a left-side view of header 50, it is to be understood that the placement, arrangement, and spacing of the right-side upper control arm 210 and the right-side lower control arm 220 about the right side of the header 50 generally mirrors the placement, arrangement, and spacing of the left-side upper control arm 210 and the left-side lower control arm 220 about the left side of the header 50 as illustrated in FIG. 2, and that the sizing of the right-side and left-side upper control arms 210 is substantially identical, as is the sizing of the right-side and left-side lower control arms 220.

Upper control arms 210 and lower control arms 220 may be formed of any desired material or combination of materials (e.g., reinforced steel), with each control arm being defined by a fixed length and a structure extending fixedly between first and second ends (i.e. the structure does not comprise any hinged or otherwise segmented portions via which the shape of the structure may be altered during operation of the header 50).

As shown in FIG. 2, the length of the upper control arms 210 is less than the length of the lower control arms 220. As will be described in more detail with regards to FIGS. 3A and 3B, such an arrangement of shorter length upper control arms 210 and longer length, lower control arms 220 defines a header 50 travel pattern that advantageously results in the front of the header 50 heeling backwards and moving upward in response to the header 50 encountering raised mounds of material in its path.

According to various embodiments, the lower control arms 220 each have a length that is between approximately 30% and approximately 70%, more specifically between approximately 40% and approximately 60%, and even more specifically approximately 50% longer than a length of the upper control arms 210. For example, according to some embodiments, the length of the lower control arm 220 is between approximately 500 mm and approximately 600 mm, more specifically between approximately 525 mm and approximately 575 mm, and even more specifically between approximately 545 mm and approximately 555 mm. According to some embodiments, the length of the upper control arm 210 may be between approximately 310 mm and approximately 410 mm, more specifically between approximately 335 mm and approximately 485 mm, and even more specifically between approximately 355 mm and approximately 365 mm. The lengths and percentages provided above are exemplary. Other lengths and percentages can be used depending upon design criteria, header type, weight, application and other system parameters.

The front ends 211 of the upper control arms 210 and the front ends 221 of the lower control arms 220 are each attached pivotably to the header 50 via front attachments 225a, 227a, respectively, and the rear ends 213 of the upper control arms 210 and the rear ends 223 of the lower control arms 220 are each attached pivotably to the harvester frame 300 via rear attachments 225b, 227b, respectively. The pivotable attachments 225a, 225b, 227a, 227b may include any number of different structures, such as, e.g., pins, bolts going through spherical rod ends, ball joints, etc. configured to allow the header 50 to pivot and move relative to the harvester frame 300.

As will be discussed with reference to FIGS. 3A and 3B below, the front ends 211 of the upper control arms 210 and the front ends 221 of the lower control arms 220 may be attached along any number of different locations on the header 50, and the rear ends 213 of the upper control arms 210 and rear ends 223 of the lower control arms 220 may be attached along any number of different locations on the harvester frame 300. As illustrated in FIG. 2, according to some embodiments, the upper control arms 210 may be attached to the header 50 and/or harvester frame 300 as high up as possible and/or the lower control arms 220 may be attached to the header 50 and/or harvester frame 300 as low as possible. In some embodiments, the front ends 211 of the upper control arms 210 and the front ends 221 of the lower control arms 220 may each be located along a vertical axis extending generally perpendicular to the horizon. In other embodiments, the front ends 211 of the upper control arms 210 may be laterally offset (either rearwardly or forwardly) relative to the front ends 221 of the lower control arms 220 such that the front ends 211 of the upper control arms 210 and the front ends 221 of the lower control arms 220 are not located along the vertical axis.

According the various embodiments, a vertical distance (i.e. a distance measured in a direction along an axis generally parallel to the horizon) between the front attachments 225a of the upper control arms 210 and the front attachments 227a of the lower control arms 220 may be the same, greater, or less than a vertical distance between the rear attachments 225b of the upper control arms 210 and the rear attachments 225b of the lower control arms 220. According to various embodiments, the vertical distance between the front attachments 225a of the upper control arms 210 and the front attachments 227a of the lower control arms 220 and/or a vertical distance between the rear attachments 225b of the upper control arms 210 and the rear attachments 225b of the lower control arms 220 may be between approximately 700 mm and approximately 1000 mm, more specifically between approximately 800 mm and approximately 900 mm, and even more specifically between approximately 855 mm and approximately 870 mm. The lengths and provided above are exemplary. Other lengths can be used depending upon design criteria, header type, weight, application and other system parameters.

In addition to increasing stability and efficiency of load transfer, such embodiments in which the distance between the upper control arms 210 and the lower control arms 220 is maximized may advantageously decrease the impact that the ratio of the lengths of the upper control arms 210 and the length lower control arms 220 may have on the arcuate trajectory of the header 50 as the header 50 travels over a raised mound of material. In particular, in such embodiments, the arcuate trajectory of the header 50 may provide a sufficient vertical displacement and attack angle increase to allow the header 50 to ride over the raised mound and avoid pushing while also limiting the degree to which the attack angle of the header 50 and cutterbar 56 is increased as the header 50 travels of the mound, thereby minimizing the amount of harvest yield loss that may result from increasing the attack angle of the header 50.

According to some embodiments, the attachment of header 50 to harvester frame 300 may be limited to only those attachments defined by the attachments of the upper control arms 210 and lower control arms 220 to the header 50 and harvester frame 300 described above. In other embodiments, as noted above, the header 50 may optionally also be attached to the harvester frame 300 via any number of different float systems 60 arrangements configured to reduce the weight of and/or act as shock absorbers as the header 50 travels across the ground.

In yet other embodiments, in addition to (or as an alternative to) an optionally provided float system 60 (and in addition to the attachment provided by upper control arms 210 and lower control arms 220) the header 50 may also be attached to the harvester frame 300 via a lift mechanism (not shown). Although the control arm linkage assembly 200 allows for the continuous, dynamic operator-free, adjustment of the attack angle and height of the header 50 to changes in terrain, according to some embodiments it may be desired to provide a lift mechanism (such as, e.g., one or more hydraulic cylinders) via which the user may selectively adjust the height and/or tilt/attack angle of the header 50 as desired. To the extent that the header 50 is provided with an optional lift mechanism, it is to be understood that the lift mechanism is incorporated into the header 50 in such a manner that does not interfere with the intended operation of the control arm linkage assembly 200 as will be described below.

Figure 3A:
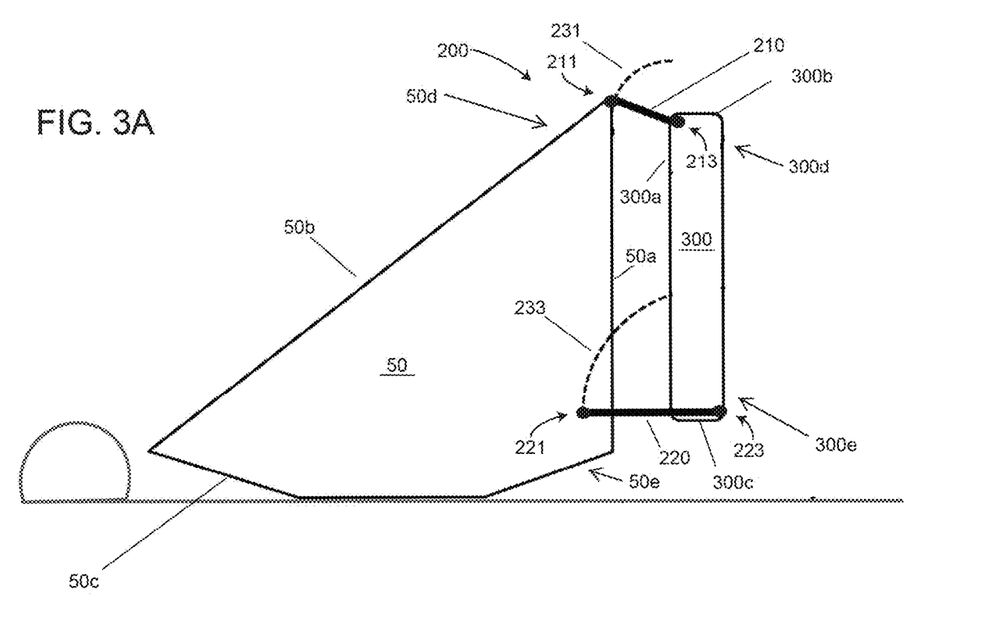
FIGS. 3A and 3B are simplified general block diagrams illustrating the operation of the control arm linkage assembly to control movement of a header relative to a harvester frame, according to some embodiments.
Figure 3B:
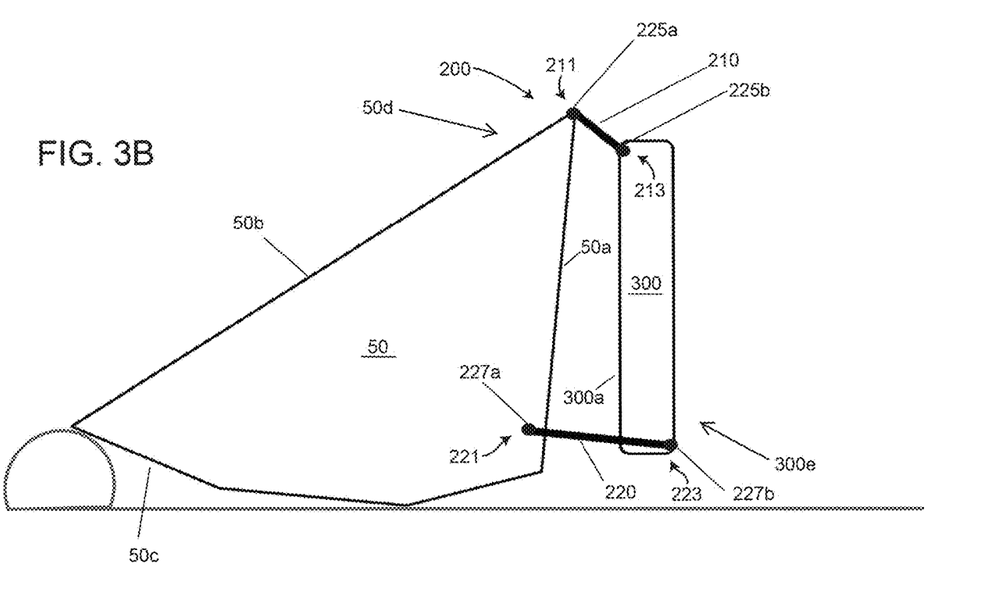

Referring to FIGS. 3A and 3B, block diagrams illustrating the manner in which the control arm linkage assembly 200 advantageously allows header 50 to adjust to uneven terrain according to various embodiments are shown. As described above, control arm linkage assembly 200 comprises a pair of shorter length upper control arms 210 and a pair of longer length lower control arms 220 that pivotably connect the header 50 to a harvester frame 300. However, as illustrated by FIGS. 3A and 3B, although the upper control arms 210 and lower control arms 220 are pivotablly attached to the header 50 and harvester frame 300, the vertical distance between the front attachments 225a, 227a of the front ends 211, 221 of the upper control arms 210 and lower control arms 220, respectively, as well as the vertical distance between the rear attachments 225b, 227b of the rear ends 213, 223 of the upper control arms 210 and lower control arms 220, respectively, remain unchanged during use of the header 50.

The upper control arms 210 and lower control arms 220 may extend at any desired angles relative to the horizon. While in some embodiments the upper control arms 210 and the lower control arms 220 may extend along the same angles (i.e. extend parallel to one another), in other embodiments, such as, e.g. illustrated in FIGS. 3A and 3B, the upper control arms 210 may extend at an angle that is different (i.e. greater or smaller) from the angle along which the lower control arms 220 extend.

As shown in FIG. 3A, because the front ends 211 of the upper control arms 210 and front ends 221 of the lower control arms 220 are operably attached to the header 50 via front attachments 225a, 227a, a vertically upward imparted force onto the header 50 will result in the travel of the front attachments 225a of the front ends 211 of the upper control arms 210 being defined by an arcuate upper path 231 and the travel of the front attachments 227a of the front ends 221 of the lower control arms 220 being defined by an arcuate lower path 233.

More specifically, as illustrated in FIG. 3B, in response to an upward force being imparted onto the header 50 as the header 50 encounters a raised mound, the upward displacement of the header 50 causes the front attachments 225a of the front ends 211 of the upper control arms 210 to travel from their original position (as shown in FIG. 3A) along a trajectory defined by arcuate upper path 231 while also causing the front attachments 227a of the front ends 221 of the lower control arms 220 to travel from their original positions (as also shown in FIG. 3A) along a trajectory defined by arcuate lower path 233. Because the vertical distances between the upper control arms 210 and the lower control arms 220 are fixed, the combined constrained travel of the attachments 225a of the upper control arms 210 along a trajectory defined by arcuate upper path 231 and the constrained travel of the attachments 227a of the lower control arms 220 along a trajectory defined by arcuate lower path 233 limits and generally constrains the displacement of the header 50 to a generally upward and rearwards arcuate trajectory as the header 50 travels over the raised terrain. This resultant tilting/heeling backwards of the header 50 as the header travels upward (such as, e.g., illustrated in FIG. 3B) increases the attack angle of the header 50 as the header 50 traverse the raised mound, making it easier for the header 50 to travel over the mound while minimizing the risk of pushing as the header 50 does so.

Although, as noted above, the control arm linkage assembly 200 allows the attack angle of the header 50 to increase as the header 50 encounters raised terrain, the arcuate travel trajectory defined by the control arm linkage assembly 200 also limits the extent to which the attack angle is increased. By constraining the degree to which the attack angle of the header 50 may increase, the control arm linkage assembly 200 permits the header 50 to heel/tilt backwards so as to allow the header 50 to more easily travel over raised mounds (thereby minimizing pushing) while also minimizing the degree of the detrimental effect that increasing the attack angle of the header 50 may have with respect to crop harvest yield for low growth crops (such as, e.g., soybeans).

In particular, in contrast to the arcuate path along which a header 50 having control arm linkage assembly 200 travels over raised material, a header arrangement having a similarly structured header as header 50 buy not incorporating a control arm linkage assembly 200 will travel over raised material along a generally linear path. Because the arcuate path along which the header 50/control arm linkage assembly 200 described herein travels is defined by a slope that is smaller than the slope defined by the generally linear path along which a header arrangement not incorporating a control arm linkage assembly 200 would travel, the header 50/control arm linkage assembly 200 allows the header 50 of the present disclosure to clear the uneven terrain with a smaller attack angle than would be possible if such a control arm linkage assembly 200 were not incorporated into the header 50.

For example, according to one embodiment of the header 50/control arm linkage assembly 200 arrangement illustrated in FIGS. 3A and 3B, the length of the upper control arms 210 is approximately 360 mm±10 mm and the length of the lower control arms 220 is approximately 550 mm±10 mm, with the front attachments 225a of the upper control arms 210 located approximately 862 mm±10 mm above the front attachments 227a of the lower control arms 220 as measured in a direction along a vertical axis generally parallel to the horizon. In such an embodiment, the changes in the attack angle of the header 50 as the header travels over raised mound (such as, e.g. illustrated in FIG. 3B) is between approximately 0.5° and approximately 5°, and more specifically between approximately 1.5° and 4.5°, whereas the change in the attack angle of a similar header arrangement with does not incorporate a control arm linkage assembly 200 would be approximately 6.0°. As illustrated by the example above above, because increase in attack angle of a header may result in a decreased crop harvest yield for low growth crops, the incorporation of a control arm linkage assembly 200 which restrains the attack angle as the header 50 travels over raised terrain may result in a greater harvest efficiency as compared to a header arrangement not including a control arm linkage assembly 200 as described herein.

As noted above, the front attachments 225a of the upper control arms 210 travel along an arcuate upper path 231 and the front attachment 227a of the lower control arms 220 travel along an arcuate lower path 233 in response to an applied vertical force on the header 50. In general, as illustrated in FIG. 3A, the arcuate upper path 231 is defined by a generally circular path having a radius generally equal to the length of the upper control arms 210, while the arcuate lower path 233 is defined by a generally circular path having a radius generally equal to the length of the lower control arms 220.

In general, the curvature of the arcuate path along which the header 50 will travel as the header 50 travels over raised material in terrain will be dependent on, among other factors, the sizing, spacing and arrangement of the control arm linkage assembly 200. Accordingly, as will be understood, according to various embodiments, the degree of tilt/heel and lift of the header 50 may be adjusted as desired by adjusting or modifying any number or combination of variables that affect the arcuate trajectory of the header 50.

For example, according to some embodiments, the arcuate trajectory of the header 50 over uneven terrain may be influenced and varied by selectively modifying the lengths of the upper control arms 210 and/or lower control arms 220, and/or the modifying the relative ratio of the lengths of the upper control arms 210 relative to the lengths of the lower control arms 220, with larger ratios exhibiting a more aggressive degree of heel back (i.e. movement of an upper portion 50d of the rear surface 50a of the header 50 in a rearwards direction so as to bring the rear surface 50a of the header 50 upper portion 50d closer to the front end 300a of the harvester frame 300) of the header 50.

According to other embodiments, the arcuate trajectory of the header 50 over uneven terrain may be influenced and varied by selectively modifying the vertical spacing between the front attachments 225a of the front ends 211 of the upper control arms 210 and the front attachments 227a of the front ends 221 of the lower control arms 220 and/or by modifying the vertical spacing between the rear attachments 225b of the rear ends 213 of the upper control arms 210 and the rear attachments 227b of the rear ends 223 of the lower control arms 220, with the degree of heel back being greater as the vertical spacing of the front attachments 225a, 227a, and/or the rear attachments 225b, 227b is decreased.

In some embodiments, the arcuate trajectory of the header 50 over uneven terrain may also be influenced and varied by selectively modifying the vertical spacing between (and resultant angle defined between) the front attachments 225a and rear attachments 225b of the upper control arms 210 and/or by modifying the vertical spacing between (and the resultant angle defined between) the front attachments 227a and rear attachments 227b of the lower control arms 220.

In yet other embodiments, the arcuate trajectory of the header 50 over uneven terrain may also be influenced or varied by selectively modifying: the lateral and/or vertical spacing between the front attachments 225a of the front ends 211 of the upper control arms 210 and the rear surface 50a and/or top surface 50b of the header 50; the lateral and/or vertical spacing between the front attachments 227a of the front ends 221 of the lower control arms 220 and the rear end 50a and/or bottom surface 50c of the header 50; the lateral and/or vertical spacing between the rear attachments 225b of the rear ends 213 of the upper control arms 210 and the front end 300a and/or top surface 300b of the harvester frame 300; and/or the lateral and/or vertical spacing between the rear attachments 227b of the rear ends 223 of the lower control arms 220 and the front end 300a and/or bottom surface 300c of the harvester frame 300.

In particular, the vertical and/or lateral spacing between any of the attachments 225a, 225b, 227a, and/or 227b and the edges of any of the surfaces 50a, 50b, 50c, 300a, 300b, and/or 300c of the header 50 and/or harvester frame 300 may be selectively varied in order to avoid (or, alternatively to cause) the arcuate movement of the header 50 from being be impeded as a result of the rear end 50a of the header 50 being physically prevented from further rearwards/backwards travel by the front end 300a of the harvester frame 300. Additionally, or alternatively, in some embodiments, selectively modifying the vertical and/or lateral spacing between any of the attachments 225a, 225b, 227a, and/or 227b and any of the edge surfaces 50a, 50b, 50c, 300a, 300b, and/or 300c of the header 50 and/or harvester frame 300 may result in the header 50 pivoting downwards about front attachments 225a, 227a of the front ends 211, 221 of the upper control arms 210 and the lower control arms 220, respectively, as the header 50 moves along its arcuate trajectory, thereby decreasing the attack angle of the header 50 as the header 50 moves across its arcuate trajectory.

The examples presented above illustrate non-limiting examples of control arm linkage assembly 200 sizing, spacing and/or arrangement variables via which the arcuate trajectory of the header 50 over uneven terrain may be influenced and selectively modified. As will be understood, any number of, and any combination of these and other control arm linkage assembly 200 sizing, spacing and/or arrangement variables may be modified as desired in order to define a header 50 arcuate trajectory defined by any number or combination of desired features, such as, e.g., degree of upward lift, rearward heel, attack angle, etc.

Given the ability to selectively modify a travel path of a header 50 over uneven terrain via the selective modification of the sizing, spacing and/or arrangement of the upper control arms 210 and/or lower control arms 220, according to some embodiments, the header 50 and/or control arm linkage assembly 200 may optionally be provided with adjustment structures via which the sizing, spacing and/or arrangement of the upper control arms 210 and/or lower control arms 220 may be selectively modified. For example, according to some embodiments, the upper control arms 210 and/or lower control arms 220 may be defined by structures (e.g., a telescoping arrangement) that allow a user to selectively vary the length of the upper control arms 210 and/or lower control arms 220. In other embodiments, the header 50 may be provided by a plurality of attachments element to which any of the front attachments 225a, 227a and/or rear attachments 225b, 227b, of the upper control arms 210 and/or lower control arms 220 may be selectively attached, with the selective attachment of any or all of the attachments 225a, 227a, 225b, 227b to varying attachment elements allowing the user to vary, e.g., the vertical spacing, relative angle, distance, etc. between any one of, or any combination of, the front ends 211, 221 and/or the rear ends end 213, 223 of the upper control arms 210 and/or lower control arms 220. Alternatively, or additionally, in some embodiments, any one of, or any combination of the attachments 225a, 225b, 227a, 227b may be provided with a plurality of attachment elements via which the vertical spacing, relative angle, distance, etc. between any one of or any combination of the front ends 211, 221 and/or the rear ends end 213, 223 of the upper control arms 210 and/or lower control arms 220 may selectively be varied.

As described in the preceding paragraph, some embodiments of the header 50/control arm linkage assembly 200 may incorporate structures or elements via which the sizing, spacing and/or arrangement of the upper control arms 210 and/or lower control arms 220 relative to the header 50 and/or harvester frame 300 may be modified to adjust the arcuate travel path of the header 50 over raised portions of terrain. However, as will be understood, in such embodiments, once the desired modification to the sizing, spacing and/or arrangement of the upper control arms 210 and/or lower control arms 220 has been made, no changes to the sizing, spacing and/or arrangement of the upper control arms 210 and/or lower control arms 220 occur during operation of the header 50. For example, in embodiments in which one or both of the upper control arms 210 and/or lower control arms 220 allow for selective adjustments in length, once the upper control arms 210 and/or lower control arms 220 have been adjusted to a desired length, the length of the upper control arms 210 and lower control arms 220 remains unchanged during operation of the header 50.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. References herein to the positions of elements (e.g., "top," "bottom," "above," "below," "upper", "lower", etc.) are merely used to describe the orientation of various elements in the FIGURES. It should be noted that the orientation of various elements may differ according to other exemplary embodiments, and that such variations are intended to be encompassed by the present disclosure.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

We claim:

1. A control arm linkage assembly for an agricultural harvester comprising:
   an upper control arm defined by a first constant length;
   a lower control arm defined by a second constant length, the second length being between 40 percent and 60 percent greater than the first constant length;
   a front upper attachment coupling a front end of the upper control arm to an upper portion of a header;

a rear upper attachment coupling a rear end of the upper control arm to an upper portion of a harvester frame;
a front lower attachment coupling a front end of the lower control arm to a lower portion of the header; and
a rear lower attachment coupling a rear end of the lower control arm to a lower portion of the harvester frame;
the control arm linkage assembly being configured to vary an angle defined between a lower surface of the header and a horizon by between 1.5 degrees and 4.5 degrees in response to an upward displacement of the header relative to the harvester frame, the upward displacement is caused by the lower surface of the header engaging a ground surface as the header travels along the ground surface;
wherein a distance defined between a rear surface of the upper portion of the header and a front end of the harvester frame located directly opposite the upper portion of the header is decreased in response the upward displacement of the header relative to the harvester frame.

2. The control arm linkage assembly of claim 1, wherein movement of the header relative to the harvester frame is constrained by the upper control arm and lower control arm to the header and harvester frame.

3. The control arm linkage assembly of claim 2, wherein movement of the header relative to the harvester frame is defined by a generally arcuate travel path.

4. The control arm linkage assembly of claim 1, wherein the front end of the upper control arm and the front end of the lower control arm are each pivotably coupled to the header.

5. The control arm linkage assembly of claim 1, wherein the front ends of the upper control arm and lower control arm are each attached to a left side of the header and the rear ends of the upper control arm and lower control arm are each attached to a left side of the harvester frame, the control arm linkage assembly further comprising a second upper control arm and a second lower control arm, the front ends of each of the second upper and lower control arms being coupled to a right side of the header and the rear ends of each of the second upper and lower control arms being coupled to a right side of the harvester frame.

6. The control arm linkage assembly of claim 2, wherein a body defined between the front ends and the rear ends of the upper control arm extends fixedly about a substantially linearly axis about which the body is disposed.

7. The control arm linkage assembly of claim 6, wherein a body defined between the front ends and the rear ends of the lower control arm extends fixedly about the substantially linearly axis about which the body is disposed.

8. An agricultural harvester comprising:
a harvester frame;
a crop harvesting header; and
a control arm linkage assembly coupling a rear portion of the header to a front portion of the harvester frame, the control arm linkage assembly comprising:
a first upper control arm having a front end pivotably coupled to an upper portion of a first side of the header and a rear end pivotably coupled to the upper portion of a first side of the harvester frame;
a second upper control arm having a front end pivotably coupled to the upper portion of a second side of the header and a rear end pivotably coupled to the upper portion of a second side of the harvester frame;
a first lower control arm having a front end pivotably coupled to a lower portion of the first side of the header and a rear end pivotably coupled to a lower portion of the first side of the harvester frame; and
a second lower control arm having a front end pivotably coupled to a lower portion of the second side of the header and a rear end pivotably coupled to a lower portion of the second side of the harvester frame;
wherein a length of the first upper control arm is substantially the same as a length of the second upper control arm and a length of the first lower control arm is a constant length that is substantially the same as a constant length of the second lower control arm, the lengths of the first and second upper control arms being shorter than the constant lengths of the first and second lower control arms; and
wherein the control arm linkage assembly is configured to simultaneously raise the header upward relative to the harvester frame and rotate the header relative to a ground surface to heel an upper portion of the rear surface of the header towards the front end of the harvester frame in response to an upward force being imparted onto a bottom surface of the header, the upward force being caused at least in part by the bottom surface of the header engaging the ground surface as the header travels along the ground surface.

9. The agricultural harvester of claim 8, wherein the front ends of the first and second upper control arms are each located rearwards relative to the front ends of the first and second lower control arms.

10. The agricultural harvester of claim 9, wherein the front ends of the first and second upper control arms are each located upward relative to the rear ends of the first and second upper control arms.

11. The agricultural harvester of claim 10, wherein the front ends of the first and second lower control arms are each located upward relative to the rear ends of the first and second lower control arms.

12. The agricultural harvester of claim 8, wherein the lengths of the first and second upper control arms are each between 355 mm and 365 mm.

13. The agricultural harvester of claim 12, wherein the lengths of the first and second lower control arms are each between 545 mm and 555 mm.

14. The agricultural harvester of claim 8, wherein the lengths of the first and second lower control arms are between 40 percent and 60 percent greater than the lengths of each of the first and second upper control arms.

15. The agricultural harvester of claim 8, wherein the pivotable coupling of the rear ends of the first and second upper control arms to the harvester frame defines an arcuate upper path and the pivotable coupling of the rear ends of the first and second lower control arms to the harvester frame defines a arcuate lower path, the raising and heeling of the header in response to the upward force being imparted onto the bottom surface of the header being constrained by the arcuate upper path and the arcuate lower path.

16. The agricultural harvester of claim 8, wherein an attack angle of the header as defined between the bottom surface of the header and a horizon is configured to vary by an angle of between 1.5 degrees and 4.5 degrees in response to the upward force being imparted onto the bottom surface of the header.

17. A header terrain following system comprising:
a crop harvesting header;
a harvester frame defined by an agricultural harvester; and
a control arm linkage assembly pivotably attaching the header relative to the harvester frame, the control arm linkage assembly comprising a pair of identical upper control arms extending between upper portions of the header and harvester frame along both right and left sides of the header and harvester and a pair of identical lower control arms extending between lower portions of the header and harvester frame along both the right and left sides of the header and harvester, the upper control arms having a fixed length that is less than a fixed length of the lower control arms;

wherein, in response to a vertical movement of the header relative to the harvester frame, the control arm linkage assembly is configured to cause the header to rotate and translate relative to the harvester frame, the rotation and translation of the header relative to the harvester frame resulting in a movement of the lower portion of the header relative to the harvester frame in a direction downwards and away from the harvester frame and a movement of the upper portion of the header relative to the harvester frame in a direction upward and towards the harvester frame.

18. The header terrain following system of claim 17, wherein the movement of the lower portion of the header and the movement of the upper portion of the header are each defined by arcuate paths.

19. The header terrain following system of claim 17, wherein the fixed length of the lower control arms is between 40 percent and 60 percent greater than the fixed length of the upper control arms.

* * * * *